United States Patent [19]

Pinnow et al.

[11] Patent Number: 4,776,317

[45] Date of Patent: Oct. 11, 1988

[54] CABINET FOR TREATMENT OF BULK FOOD ITEMS

[75] Inventors: Curtis C. Pinnow, Libertyville; Robert C. Fortmann, Palatine, both of Ill.

[73] Assignee: Carter-Hoffmann Corporation, Mundelein, Ill.

[21] Appl. No.: 106,635

[22] Filed: Oct. 9, 1987

[51] Int. Cl.[4] ............................................. F24C 15/10
[52] U.S. Cl. ................................ 126/37 R; 126/21 A; 126/265; 34/169; 99/471; 99/474; 219/369; 221/150 A; 312/236
[58] Field of Search ................. 126/4, 6, 21 A, 37 R, 126/41 B, 41 C, 41 D, 252, 261, 265; 99/471, 473–476; 312/236, 250; 219/369–372, 385, 400, 408; 165/14, 64, 137, 918; 221/150 A, 191, 193, 194, 285, 311; 34/165, 169, 225, 229, 196

[56] References Cited

U.S. PATENT DOCUMENTS

| 3,261,650 | 7/1966 | Stromqvist | 34/196 |
| 3,604,126 | 9/1971 | Whelan | 34/169 |
| 4,437,396 | 3/1984 | Plattner et al. | 99/475 |

*Primary Examiner*—Samuel Scott
*Assistant Examiner*—Noah Kamen
*Attorney, Agent, or Firm*—Wood, Dalton, Phillips, Mason & Rowe

[57] ABSTRACT

A food warming apparatus is provided with a cabinet defining a food treatment space and a food storage space above the food treatment space and in communication therewith. A wall at the bottom of the food treatment space supports a supply of food. Structure is provided to gain access to the food storage space to introduce a food supply and separate structure is provided to gain access to the food in the food treatment space for removal of the treated food. Heat is directed in a circulating path upwardly through food at one portion of the treatment space and downwardly through food in another portion of the treatment space.

16 Claims, 2 Drawing Sheets

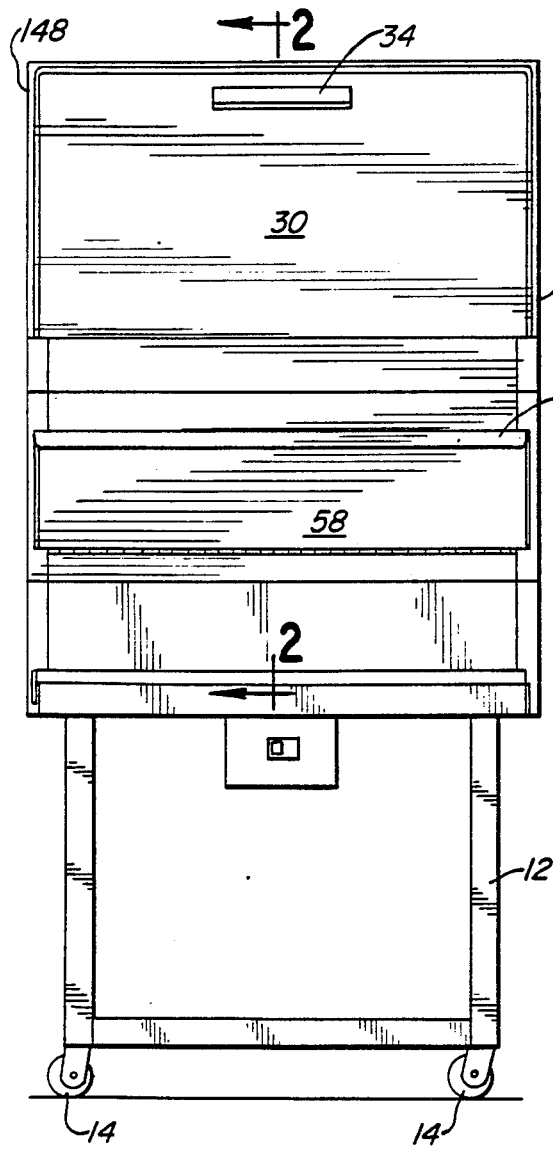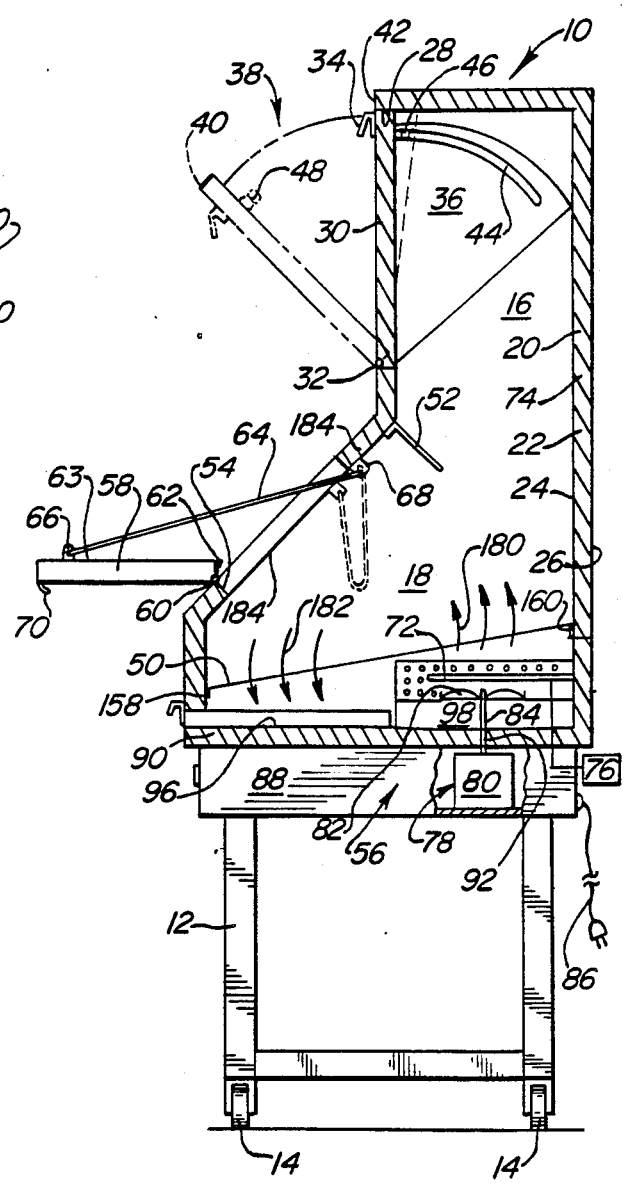
FIG. 1
FIG. 2

CABINET FOR TREATMENT OF BULK FOOD ITEMS

BACKGROUND OF THE INVENTION

1. Field of the Invention

This invention relates to heated holding cabinets for bulk food items and, more particularly, to structure for continuously loading unheated food items into the cabinet and for removing the food items from the cabinet generally in the order that they are introduced.

2. Background Art

It is known to heat and/or maintain the temperature of bulk food items in cabinets having internal spaces that are heated and oftimes humidified. Such cabinets are commonly used in restaurant and fast food operations for previously cooked dinner rolls, nacho chips, and the like. One style cabinet uses a plurality of slidable drawers which are opened for loading and closed to situate the loaded food items in the conditioned space within the cabinet.

The above structure has several drawbacks. Ideally, the drawers are sufficiently small that they can be readily closed and opened by the operator. In high volume operations, a large number of drawers may have to be used. Resultingly, such structures often take up a substantial amount of valuable space.

Additionally, such structures make quality control a very difficult task. On most cabinets, there is no way to monitor the amount of time that the food items have been in a particular drawer. Frequently, the items are removed from the drawer(s) before being thoroughly heated. Further, there may be a demand for a large number of food items requiring emptying of the contents of several drawers. It is unlikely that the temperature of the goods in each drawer will be uniform.

A further problem with the above structure is that there is a tendency, particularly when servers are rushed, to remove the last loaded foods, which are the most accessible. The result is that the fully heated foods remain in the drawer and the only partially heated food items are removed.

SUMMARY OF THE INVENTION

The present invention is specifically directed to overcoming the above enumerated problems in a novel and simple manner.

According to the present invention, a food warming apparatus is provided with a cabinet defining a food treatment space and a food storage space above the food treatment space and in communication therewith. A wall at the bottom of the food treatment space supports a supply of food. Structure is provided to gain access to the food storage space to introduce a food supply and separate structure is provided to gain access to the food in the food treatment space for removal of the treated food. Heat is directed in a circulating path upwardly through food at one portion of the treatment space and downwardly through food in another portion of the treatment space.

With the inventive structure, food items can be continuously delivered into the storage space and will fall under their own weight into the food treatment space for heating. In a preferred form, the bottom wall declines towards the front of the cabinet so that the food accumulates where it is readily accessible through opening at the front of the cabinet. The structure has potentially a very large capacity storage/treatment space and additionally affords the benefit that the first food items introduced are readily accessible to be first withdrawn. The food in the storage space will progressively feed into the treatment space under its own weight. The problem of partially heated foods is thereby overcome.

The inventive structure causes the foods in the treatment space to be uniformly heated. Heated air is forced upwardly through the treatment space, preferably adjacent the back of the cabinet, and bends forwardly and is drawn downwardly through the treatment space for recirculation. To facilitate this air circulation, a wall at the front of the cabinet is inclined from front to rear and deflects the air flow so that the circulating air is confined principally in the treatment space.

Preferably, the air originates from beneath the bottom wall, which is perforate. The bottom wall, to facilitate cleaning, is removably mounted on the cabinet.

Crumb collecting trays are provided beneath the bottom wall to be readily accessible with the bottom wall removed. The trays are located beneath the perforate portions of the bottom wall to collect crumbs that fall through the bottom wall. The trays themselves are preferably removable to facilitate emptying.

Preferably, access is gained to the food treatment space by a hinged door. The door is pivotable between a closed position and an open position. In the latter position a flat surface on the door is situated in substantially horizontal orientation to serve as a shelf, on which baskets, plates and the like can be placed as food is either loaded into or removed from the storage space.

A baffle is provided below the upper access opening in one of the food storage and treatment spaces and prevents unobstructed passage of goods introduced to the bottom of the cabinet. This baffle breaks the fall of food items introduced and thereby minimizes breakage when, for example, the cabinet is being filled with chips or other brittle items.

BRIEF DESCRIPTION OF THE DRAWINGS

FIG. 1 is a front elevation view of a food treatment cabinet according to the present invention;

FIG. 2 is a sectional view of the cabinet along line 2—2 of FIG. 1;

DETAILED DESCRIPTION OF THE DRAWINGS

Figures 3, 4:
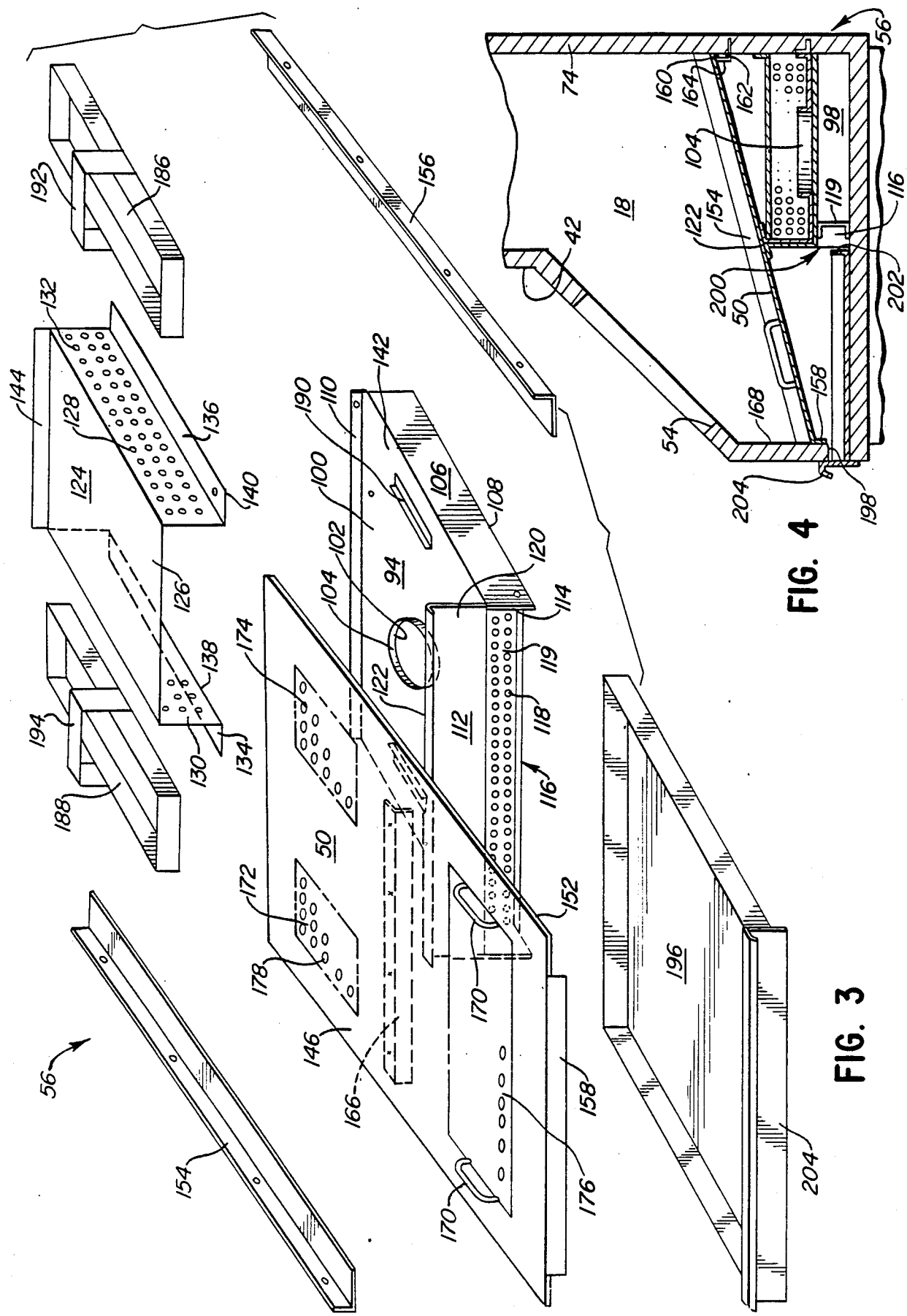
FIG. 3 is an exploded perspective view of structure for circulating heated air within the cabinet.
FIG. 4 is a fragmentary, section view of the cabinet with the structure in FIG. 3 assembled.

Referring initially to FIGS. 1 and 2, a treatment apparatus for bulk food items according to the present invention is shown and consists of a food holding cabinet at 10 supported on a stand 12 mobilized by casters 14. The cabinet 10, when viewed from the side, has a generally L-shaped configuration and defines an internal storage space 16 and an enlarged, food treatment space 18 below and in communication with the food storage space 16. The cabinet 10 has enclosure walls 20 with an insulated core 22 and internal and external stainless steel sheet layers 24, 26 respectively, encasing the core 22.

The upper region of the cabinet 10 has a rectangular opening 28 through which access can be gained to the food storage space 16. A door 30, matched to the rectangular opening 28, has a hinge 32 at its lower edge to permit pivoting of the door selectively between the closed position shown in solid lines in FIG. 2 and the open position shown in phantom. A front handle 34 can be readily grasped to manipulate the door 30. The door has attached, externally spaced wings 36 which act in conjunction with the door 30 to funnel food items introduced through opening 38 over the top edge 40 of the door at the front wall 42 of the cabinet 10. Each side wing 36 has an arcuate slot 44 in which a pin 46 on the cabinet 10 is guided as the door moves between its open and closed positions. Door travel is arrested in the fully open position upon the pin 46 reaching the end of the slot. The door is maintained in the closed position by a conventional type latch structure 48.

With the door 30 open, food items introduced fall through the food storage space 16 into the food treatment space 18 therebelow and against a wall 50 at the bottom of the space 18. An angularly disposed baffle 52 breaks the fall of the introduced food items to minimize breakage, which is particularly advantageous when, for example, brittle chips are being introduced. As seen in FIG. 2, the bottom wall 50 slopes downwardly towards the front of the cabinet 10 so that the food items accumulate adjacent the front of the cabinet to be readily accessible through a second opening 54 in the cabinet front wall 42, through which access can be gained to the food treatment space 18. The food in the treatment space 18 is heated by structure shown generally at 56, which structure will be described in detail below.

A door 58 is matched to the opening 54 and has a hinge 60 at its lower edge 62 to permit pivoting of the door 58 between the closed position in FIG. 1 and the open position in FIG. 2. In the open position, a flat wall surface 63 on the door 58 is horizontally oriented and serves as a shelf, as for the placement of baskets, plates and the like which are used to contain the food items placed into and removed from the space 18. Pivoting of the door 58 past the solid line, open position of FIG. 2, is prevented by a flexible cord 64 at each side of the door 58. One end of each cord 64 attaches to a tab 66 adjacent the top of the door and the other end attaches to a tab 68 adjacent the top of the opening 54. With the door closed, the cord 64 folds into a U-shape and resides out of the user's way in the food treatment space 18. A handle 70 is provided on the door 58 to facilitate manipulation thereof.

It can be seen that food introduced through the upper opening 28 falls against the bottom wall 50 and moves towards the front of the cabinet 20. The food is readily accessible through the opening 54 in the order that it is introduced into the cabinet i.e. first in, first out. Only food items in the treatment space 18 are accessible through the opening 54, and the food in the space 18 is uniformly heated by the structure 56.

The details of the heating structure are shown in FIGS. 2-4. The heating structure 56 consists of a conventional heater element 72 mounted on the back wall 74 of the cabinet 10. A conventional control 76 is provided to selectively raise and lower the temperature of the element 72. A fan at 78 directs air upwardly against the element 72 and thereafter the heated air is directed into the food treatment space 18. The fan 78 has a motor 80 which drives a blade 82 carried on a shaft 84. A power supply cord 86 for the fan motor 80 extends out the back of a housing 88 beneath the cabinet 10, which housing 88 supports the fan motor 80. A base wall 90 of the cabinet 10 has a through opening 92 to accept the fan shaft 84. The base wall 90 supports a shroud 94 which, in conjunction with the top surface 96 of the base wall 90, defines a chamber 98 for operation of the fan blade 82.

The shroud 94 has a flat, horizontal, solid wall 100 with a central opening 102 therein with a surrounding, upturned annular flange 104 of slightly larger diameter than that of the fan blade 82. The wall 100 has two, laterally spaced, depending walls 106 (one shown) each having a bottom edge 108 which bears on the upwardly facing surface 96 of the base wall 90. The wall 100 is bent up at its rearward edge to define a flange 110 which is secured to the rear wall 74 of the cabinet 10 as by screws or rivets. The shroud 94 has a vertically extending front wall 112 that is recessed slightly rearwardly of the front edges 114 of the walls 106, below the wall 100, so as to define a pocket 116 under the wall 100. The front wall 112 has rows of through openings 118 in that portion 119 below the wall 100, to establish communication between the fan chamber 98 and the food treatment space 18. The wall portion 119 below the shroud wall 100 is defined by a forwardly opening U-shaped channel, shown clearly in FIG. 4. The portion 120 of wall 112 above the shroud wall 100 is integrally forward out of the shroud 94 and bent forwardly at the top region thereof to define an upwardly facing bearing edge 122 for the bottom wall 50.

A deflector 124 has an inverted U-shape in cross section with a solid, horizontal wall 126 and depending, spaced side walls 128, 130, each having spaced rows of through openings 132. The bottom of each wall 128, 130 is outturned to define flanges 134, 136 with underside surfaces 138, 140 respectively, which bear on the upwardly facing surface 142 of the shroud wall 100. The forward portion of the deflector 124 is open and in assembled relationship sealed by the upper portion 120 of wall 112 on the shroud 94. The flanges 134, 136 are secured to the shroud wall 100 as by screws or rivets. A flange 144 is bent upwardly out of the deflector wall 126 and suitably, fixedly secured to the cabinet back wall 74.

The bottom wall 50 has a flat body 146 which is of a dimension to span the space between the cabinet side walls 148, 150 (see FIG. 1). The underside 152 of the wall 50 is borne by L-shaped metal supports 154, 156, carried respectively on the cabinet side walls 148, 150. The supports 154, 156 are inclined from the vertical, as seen clearly in FIG. 4. The wall 50 has a depending front flange 158 and a depending rear flange 160. The rear flange 160 nests in an upwardly opening slot 162 defined by an L-shaped bracket 164 on the back wall 74 of the cabinet. The mid-portion of the wall 50 has an L-shaped reinforcing brace 166 which rests on the bearing edge 122 on the wall 112 of the shroud 94. The forward flange 158 bears facially against the rearwardly facing surface 168 on the front cabinet wall 42. The bottom wall 50 is held in place on the aforementioned supports under its own weight. The wall 50 is not otherwise fastened to the cabinet and is thus removable for cleaning. Spaced handles 170 are provided on the wall 50 to facilitate placement and removal thereof. Removal of the wall 50 involves tipping the rearward portion of the wall upwardly and thereafter directing the wall 50 upwardly sufficiently that the forward portion of the wall can be passed through the opening 54 in the front of the cabinet 10.

The wall 50 has rectangular, perforate areas 172, 174 adjacent the rear thereof and laterally outwardly of the solid wall 126 on the deflector 124. A rectangular, perforate area 176 is provided in the wall 50 forwardly of the shroud wall 112. The rectangular perforation pattern is exemplary only and should not be viewed as limiting and only a few of the through openings 178 for each area 172, 174, 176 are shown.

In operation, the fan blade 82 forces air principally radially through the side walls 128, 130 of the deflector 124. Any air that flows upwardly from the fan blade 82 is deflected laterally by the solid wall 126 of the deflector 124 and through the walls 128, 130. The laterally moving air is forced over the heating element 72 and in the process the temperature thereof is elevated. The heated air passing through the walls 128, 130 rises and is deflected upwardly by the cabinet side walls 148, 150 and through the perforate areas 172, 174 of the wall 50 and into the space 18, as indicated by the arrows 180 in FIG. 2.

The fan blade 82 evacuates the space in the chamber 98 so that air in the space 18 is drawn downwardly in the direction of arrows 182 through the portion 119 of wall 112 back into the chamber 98. The air circulates continuously in this manner and the circulating air is confined principally within the air treatment chamber 118. The mid-portion 184 of the front cabinet wall 42 is inclined and has a rearwardly facing surface 184 which guides the circulating air in its path. The circulating air effects uniform heating of the food within the space 18.

In the event that food such as chips and the like are placed in the cabinet 10, there tends to be a crumb accumulation on the base wall 50. Small crumbs may pass through the openings 178 in the perforate areas 172, 174, 176 and below the wall 50. Accumulation trays 186, 188 are mounted adjacent the walls 128, 130 of the shroud 124 and are supported on the upper surface 142 of the shroud 94 to collect the crumbs. L-shaped brackets 190 are provided on the shroud 94 to assure consistent placement of the trays 186, 188. The trays 186, 188 each have a handle 192, 194 to facilitate removal thereof with the base wall 50 either tilted up or removed from the cabinet 10.

A third tray 196 is provided beneath the perforate area 176 to accumulate crumbs beneath the front of the wall 50. The tray 196 slides through an opening 198 in the front wall 42 of the cabinet 10 and against the upwardly facing surface 96 of the base wall 90. As can be seen in FIG. 4, the wall portion 119 recessed behind the portion 120 of wall 112 permits the flow of air in a path 200 between the rear wall 202 of the tray 196 and the shroud 94. The handle 204 facilitates sliding movement of the drawer 196 into and out of the cabinet.

The above described cabinet is thus easily cleaned, thoroughly heats bulk items and facilitates continuous loading and removal of food items on a first in first out basis.

We claim:

1. A food warming apparatus comprising:
   a cabinet defining a food treatment space and a food storage space above said food treatment space and in communication therewith;
   means at the bottom of the food treatment space for supporting food in the food treatment space;
   means for directing heated air in a circulating path upwardly through food in one portion of the treatment space and downwardly through food in another portion of the treatment space;
   first means for gaining access to the food storage space to introduce food therein; and
   second means below said first means for gaining access to said food treatment space to permit removal of food therein.

2. The food warming apparatus according to claim 1 wherein said cabinet is configured so that there is an unobstructed vertical path between the food treatment space and the food storage space so that food introduced to the food storage space falls by gravity into the food treatment space.

3. The food warming apparatus according to claim 1 wherein said food supporting means comprises a peforate bottom wall.

4. The food warming apparatus according to claim 3 further including means for heating air and a fan for moving air in said circulating path to said heating means and through the perforate bottom wall.

5. The food warming apparatus according to claim 3 including means to removably mount the perforate bottom wall in the food treatment space to facilitate cleaning.

6. The food warming apparatus according to claim 3 wherein a crumb collecting tray is provided beneath said bottom wall and means are provided to removably install the crumb collecting tray adjacent the bottom of the food treatment space.

7. The food warming apparatus according to claim 3 wherein said cabinet has a front side and a back side, the second means is adjacent the front of the cabinet and means mount the bottom wall so that the bottom wall declines from the back side to the front side of the cabinet to accumulate food adjacent the second means so that food is gravitationally displaced proximate said second means to facilitate ready access to the food in the treatment space.

8. The food warming apparatus according to claim 3 wherein the food treatment space and food storage space are in at least partial vertical alignment and baffle means is provided in one of said food treatment and food storage spaces to break the fall of food from said food storage space to said bottom wall.

9. The food warming apparatus according to claim 1 wherein said second means comprises an opening in the cabinet, a door with a flat face and means mounting the door to the cabinet for pivoting movement between a closed position wherein the door closes the cabinet opening and an open position wherein the flat door face is substantially horizontally situated so as to function as a work shelf adjacent said second means.

10. A food warming apparatus comprising:
   a cabinet having a front side and a rear side and defining a food storage space and a food treatment space below and in communication with the food storage space;
   a perforate wall at the bottom of the food treatment space for supporting food in the food treatment space;
   means for supporting the bottom wall so that the bottom wall declines from the rear side towards the front side of the cabinet to thereby cause food introduced to the food treatment space to accumulate at the front side of the cabinet;
   first means for gaining access to the food storage space to introduce food therein;
   second means below said first means for gaining access to said food treatment space to permit removal of food therefrom;
   a source of heated air; and
   means for directing air in a circulating path laterally beneath the bottom wall upwardly through the bottom wall and food in the food treatment space and downwardly through food in the food treatment space and the bottom wall for redirection laterally beneath the bottom wall.

11. The food warming apparatus according to claim 10 wherein said source of heated air comprises a heater element and a fan for directing air against the heater element.

12. The food warming apparatus according to claim 10 wherein means removably mount the bottom wall in the food treatment space to facilitate cleaning.

13. The food warming apparatus according to claim 10 including a crumb collecting tray and means removably mount the crumb collecting tray beneath the bottom wall.

14. The food warming apparatus according to claim 10 including a fan with a blade and wherein said air directing means includes a deflector beneath the bottom wall, said deflector defining a space for the fan blade and having a solid wall above the fan and horizontally spaced vertically extending perforate walls, said solid wall causing air moved upwardly by the fan to be deflected through said perforate walls, and means are provided for developing suction upon said fan being operated and for thereby drawing air from the food treatment space into the space for the fan blades and against the fan blades to be thereafter moved by the fan blades through said vertically extending perforate walls.

15. The food warming apparatus according to claim 14 wherein said cabinet has a wall adjacent the front of the cabinet and above the bottom wall that inclines from the front side of the cabinet to the rear side of the cabinet to deflect circulating air in the food treatment space downwardly to be picked up by the suction developing means.

16. The food warming apparatus according to claim 10 wherein a baffle is mounted in one of the food storage space and food treatment space to deflect incoming food from the food storage space delivered through the first means to prevent unobstructed passage of incoming food against the bottom wall.

* * * * *